US 6,700,682 B1

(12) United States Patent
Nishida

(10) Patent No.: US 6,700,682 B1
(45) Date of Patent: Mar. 2, 2004

(54) IMAGE PROCESSING SYSTEM CAPABLE OF EASILY CHANGING SUBSCANNING MAGNIFICATION IN IMAGE READ

(75) Inventor: Ikuo Nishida, Kawasaki (JP)

(73) Assignees: Kabushiki Kaisha Toshiba, Kawasaki (JP); Toshiba Tec Kabushiki Kaisha, Tokyo (JP)

(*) Notice: Subject to any disclaimer, the term of this patent is extended or adjusted under 35 U.S.C. 154(b) by 0 days.

(21) Appl. No.: 09/385,446

(22) Filed: Aug. 30, 1999

(30) Foreign Application Priority Data

Sep. 3, 1998 (JP) .......................................... 10-249772

(51) Int. Cl.⁷ .............................................. H04N 1/393
(52) U.S. Cl. ..................... 358/451; 358/451; 358/497; 382/317; 382/299; 348/240.99; 348/240.2
(58) Field of Search ................................ 358/497, 451, 358/443; 382/317, 299; 348/240.99, 240.2, 561

(56) References Cited

U.S. PATENT DOCUMENTS

| 4,587,621 A | | 5/1986 | DuVall ........................ 364/577 |
| 4,809,083 A | | 2/1989 | Nagano et al. ............. 358/287 |
| 5,083,216 A | | 1/1992 | Abuyama .................... 358/451 |
| 5,189,529 A | * | 2/1993 | Ishiwata et al. ............ 358/451 |
| 5,336,878 A | | 8/1994 | Boyd et al. .................. 250/208 |
| 5,495,296 A | * | 2/1996 | Dosho et al. ................ 348/571 |
| 5,535,007 A | | 7/1996 | Kim ............................. 358/296 |
| 5,704,019 A | | 12/1997 | Akiyama et al. ........... 395/101 |
| 6,104,841 A | * | 8/2000 | Tojo et al. ................... 382/299 |
| 6,278,513 B1 | * | 8/2001 | Murata et al. ................ 355/44 |
| 6,400,854 B1 | * | 6/2002 | Kudoh ......................... 382/317 |

FOREIGN PATENT DOCUMENTS

| JP | 3-64166 | 3/1991 |
| JP | 3-171872 | 7/1991 |
| JP | 5-48881 | 2/1993 |
| JP | 9-65113 | 3/1997 |
| JP | 9-69938 | 3/1997 |

* cited by examiner

Primary Examiner—Kimberly Williams
Assistant Examiner—Melanie Vida
(74) Attorney, Agent, or Firm—Foley & Lardner

(57) ABSTRACT

An accumulation unit accumulates, in a 1-line element corresponding to the main scanning direction, an electrical signal prepared by photoelectrically converting optical image information obtained by scanning an original image to be formed with a carriage in the subscanning direction. A magnification setting unit sets the copy magnification. A speed change unit changes the moving speed of the carriage in accordance with the copy magnification, and when the set copy magnification is equal to or smaller than a certain magnification in reduction, changes the carriage moving speed to 1/n (n: a natural number larger than 1) from the relationship between the current magnification and the carriage moving speed. A preprocessing unit converts the electrical signal into a digital signal, has a line memory for storing 1-line input image data in the main scanning direction, performs arithmetic processing for multilevel n-line data in the main scanning direction to change the subscanning magnification in reduction, and outputs 1-line output image data in the main scanning direction. An image data processing unit performs predetermined image data processing including processing of receiving for each pixel the 1-line output image data in the main scanning direction output from the preprocessing unit, and converting the image data into binary data.

10 Claims, 7 Drawing Sheets

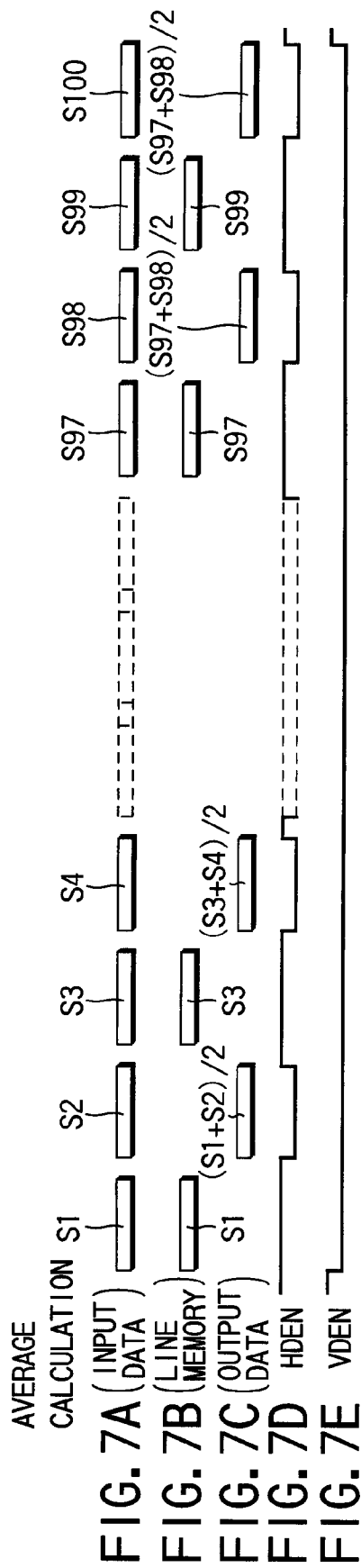
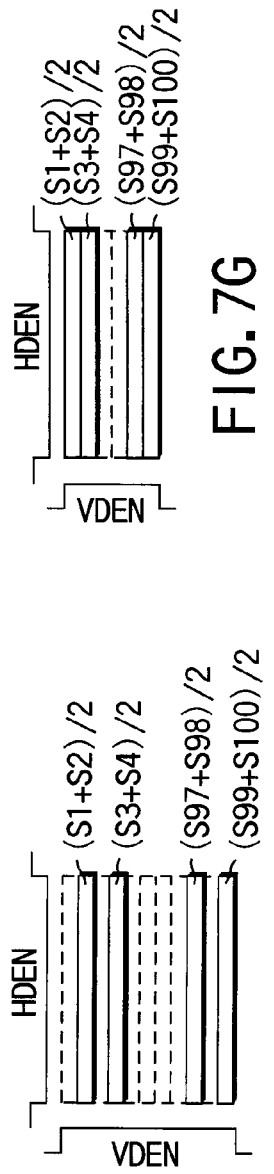

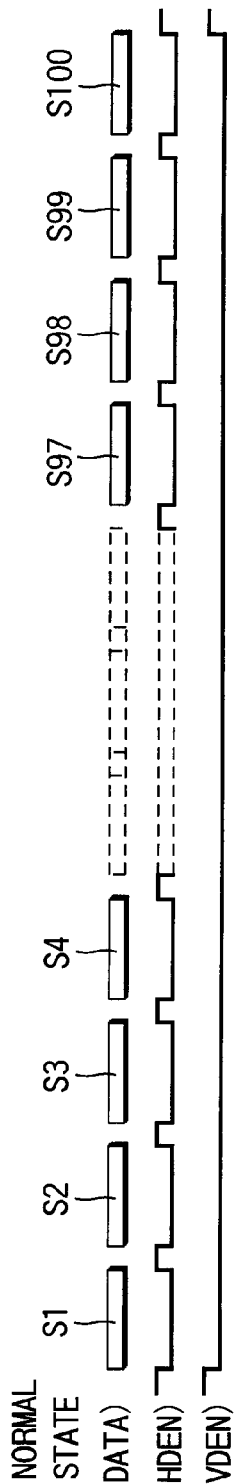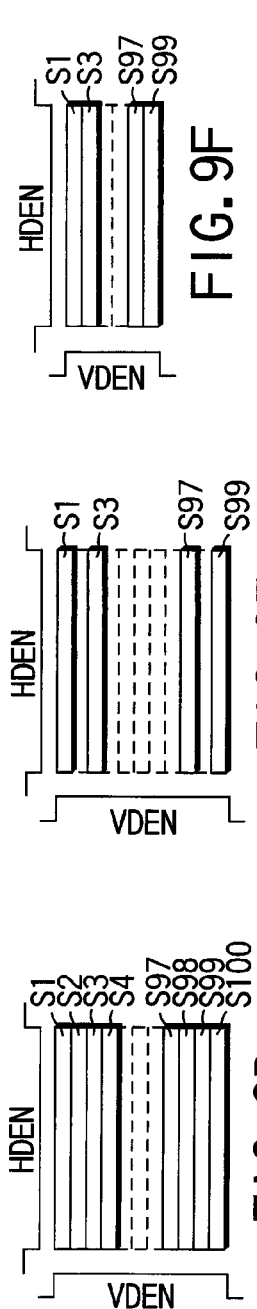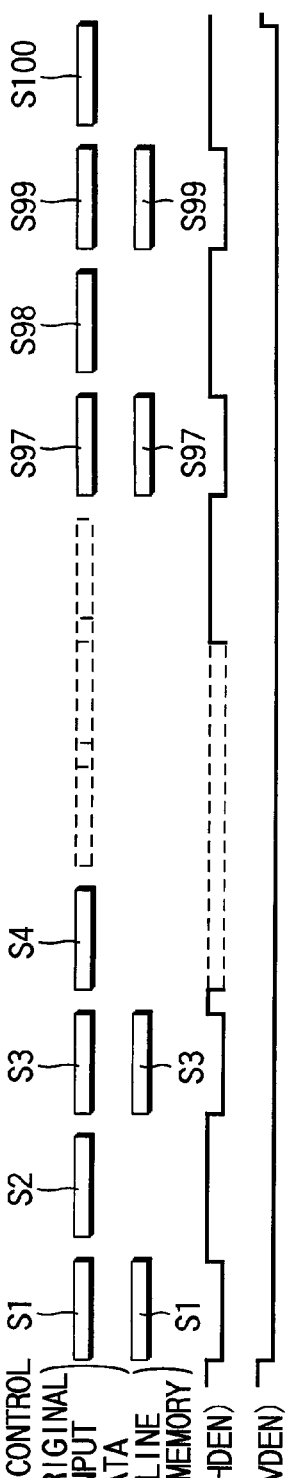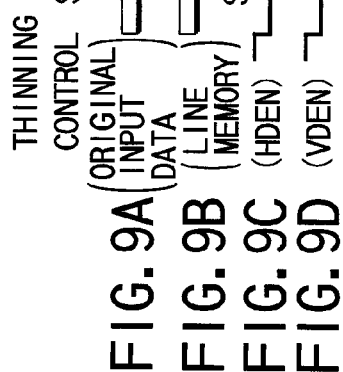

IMAGE PROCESSING SYSTEM CAPABLE OF EASILY CHANGING SUBSCANNING MAGNIFICATION IN IMAGE READ

BACKGROUND OF THE INVENTION

As is well known, image processing systems such as an electronic copying machine, digital copying machine (PPC), and facsimile apparatus use, e.g., a charge-coupled device (CCD) as an image read photoelectric conversion element in a scanner.

An optical read scanner system of reading image data with the photoelectric conversion element such as the CCD widely adopts for the main scanning direction a method of performing arithmetic processing for a digital signal in order to change the output magnification because the image read size (magnification) is determined by the number of CCD pixels and the lens magnification.

For the subscanning direction (carriage moving direction), the system adopts a method of changing the carriage moving speed to change the original width read by one main scanning line, thereby changing the magnification, a method of reading 1-page image data and changing the magnification by image processing (arithmetic processing), and the like.

However, according to the method of changing the carriage moving speed to change the subscanning magnification, when the magnification changeable range is from 25% to 400%, the carriage moving speed at a magnification of 400% must be 16 times that at a magnification of 25%.

For example, when the carriage moving speed is 200 mm/sec at a magnification of 100%, the carriage moving speed must be 50 mm/sec at a magnification of 400% and 800 mm/sec at a magnification of 25%.

To realize this, a carriage driving motor must operate within the 16-time speed range of 50 to 800 mm/sec.

To stably read an image at a high carriage moving speed of 800 mm/sec at a magnification of 25%, a very long acceleration distance and a carriage driving stabilization distance must be defined outside the image region (larger than the original size), resulting in a large device or scanner size.

If the magnification is changed by image processing (arithmetic processing) without changing the subscanning moving speed, 1-page image data must be temporarily stored in a memory after a read.

In general, the scanner reads a multilevel image. Assuming that one pixel data is 8 bits, A3-size data is consisted about 9 MB pixels at a resolution of 600 dpi. Thus, to directly store 1-page image data in the memory, A3-size data spends a memory capacity of 9×8=72 MB.

To ensure this memory capacity in a semiconductor element such as a DRAM, the cost greatly increases. To ensure this memory capacity in a storage device such as a hard disk, the read/write speed of the hard disk decreases, resulting in a low processing speed.

According to a method of storing image data after binary data conversion, the magnification is changed after binary data conversion, so the image quality greatly degrades. To intermediately change the magnification, a line memory for the number of main scanning lines corresponding to the subscanning magnification must be managed to complicate calculation.

BRIEF SUMMARY OF THE INVENTION

The present invention has been made to eliminate the conventional drawbacks, and has as its object to provide an image processing system including an image processing method and image processing apparatus capable of easily realizing reduction (magnification change) processing in the subscanning direction by changing the magnification in the image read subscanning direction (carriage moving direction) by both the conventional carriage moving speed change method and the signal processing method without increasing the device width (read scanner size), avoiding variations arising from high-speed carriage operation, performing any complicated arithmetic processing, or requiring any large-capacity memory in an image forming apparatus using, e.g., a charge-coupled device (CCD) as an image read photoelectric conversion element in a scanner.

To achieve the above object, according to one aspect of the present invention, there is provided an image processing method comprising the steps of:

setting a magnification for an original image to be processed;

when the set magnification is not larger than a certain magnification in reduction in changing in accordance with the set magnification a moving speed of a carriage for reading the original image to be processed, changing the carriage moving speed to 1/n (n: a natural number larger than 1) from a relationship between a current magnification and the carriage moving speed;

accumulating, in a 1-line element corresponding to a main scanning direction, an electrical signal prepared by photoelectrically converting optical image information obtained by scanning the original image to be processed by the carriage in a subscanning direction;

converting the electrical signal into a digital signal, storing 1-line input image data in the main scanning direction in reduction, performing average calculation for multilevel n-line data in the main scanning direction to change a subscanning magnification in reduction, and outputting 1-line output image data in the main scanning direction; and performing predetermined image data processing including processing of receiving for each pixel the 1-line output image data in the main scanning direction, and converting the image data into binary data.

To achieve the above object, according to another aspect of the present invention, there is provided an image processing method comprising the steps of:

setting a magnification for an original image to be processed;

when the set magnification is not larger than a certain magnification in reduction in changing in accordance with the set magnification a moving speed of a carriage for reading the original image to be processed, changing the carriage moving speed to 1/n (n: a natural number larger than 1) from a relationship between a current magnification and the carriage moving speed;

accumulating, in a 1-line element corresponding to a main scanning direction, an electrical signal prepared by photoelectrically converting optical image information obtained by scanning the original image to be processed by the carriage in a subscanning direction;

converting the electrical signal into a digital signal, thinning out multilevel 1-line input image data in the main scanning direction to change a subscanning magnification in reduction, and outputting 1-line output image data in the main scanning direction; and performing predetermined image data processing including processing of receiving for each pixel the 1-line output image data in the main scanning direction for each pixel, and converting the image data into binary data.

To achieve the above object, according to still another aspect of the present invention, there is provided an image processing apparatus comprising:

accumulation means for accumulating, in a 1-line element corresponding to a main scanning direction, an electrical signal prepared by photoelectrically converting optical image information obtained by scanning an original image to be formed with a carriage in a subscanning direction;

magnification setting means for setting a copy magnification of the original image to be formed;

speed change means for changing a moving speed of the carriage in accordance with the copy magnification set by the magnification setting means, and when the set copy magnification is not larger than a certain magnification in reduction, changing the carriage moving speed to 1/n (n: a natural number larger than 1) from a relationship between a current magnification and the carriage moving speed;

preprocessing means which converts the electrical signal accumulated in the accumulation means into a digital signal, has a line memory for storing 1-line input image data in the main scanning direction, performs arithmetic processing for multilevel 2-line data in the main scanning direction to change a subscanning magnification in reduction, and outputs 1-line output image data in the main scanning direction;

image data processing means for performing predetermined image data processing including processing of receiving for each pixel the 1-line output image data in the main scanning direction output from the preprocessing means, and converting the image data into binary data; and storage means for storing at least 1-page binary data of the original image to be formed among the binary data from the image data processing means, wherein in reduction, the carriage moving speed is changed to 1/n (n: a natural number larger than 1) a carriage moving speed in changing the subscanning magnification by the speed change means only by the carriage moving speed, and at the same time, multilevel 2-line data in the main scanning direction is converted into 1-line data by average calculation by the preprocessing means, thereby changing the subscanning magnification.

To achieve the above object, according to still another aspect of the present invention, there is provided an image processing apparatus comprising:

accumulation means for accumulating, in a 1-line element corresponding to a main scanning direction, an electrical signal prepared by photoelectrically converting optical image information obtained by scanning an original image to be formed with a carriage in a subscanning direction;

magnification setting means for setting a copy magnification of the original image to be formed;

speed change means for changing a moving speed of the carriage in accordance with the copy magnification set by the magnification setting means, and when the set copy magnification is not larger than a certain magnification in reduction, changing the carriage moving speed to 1/n (n: a natural number larger than 1) from a relationship between a current magnification and the carriage moving speed;

preprocessing means for converting the electrical signal accumulated in the accumulation means into a digital signal, performing arithmetic processing for multilevel 1-line input image data in the main scanning direction to change a subscanning magnification in reduction, and outputting 1-line output image data in the main scanning direction;

image data processing means for performing predetermined image data processing including processing of receiving for each pixel the 1-line output image data in the main scanning direction output from the preprocessing means, and converting the image data into binary data; and storage means for storing at least 1-page binary data of the original image to be formed among the binary data from the image data processing means, wherein in reduction, the carriage moving speed is changed to 1/n (n: a natural number larger than 1) a carriage moving speed in changing the subscanning magnification by the speed change means only by the carriage moving speed, and at the same time, multilevel 1-line data in the main scanning direction is converted into 1-line data by thinning processing by the preprocessing means, thereby changing the subscanning magnification.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 7A to 7G are timing charts in the present invention when data of the first line is stored, data of the next main scanning line is received and averaged with the data of the first line, and the average is output to a subsequent image processing ASIC (2) 705;

FIGS. 8A to 8D are timing charts when data of the first line is stored and output to the subsequent image processing ASIC without calculating any average; and FIGS. 9A to 9F are timing charts in the present invention when main scanning data is thinned out every other line and output to the subsequent image processing ASIC.

DETAILED DESCRIPTION OF THE INVENTION

Figure 1:
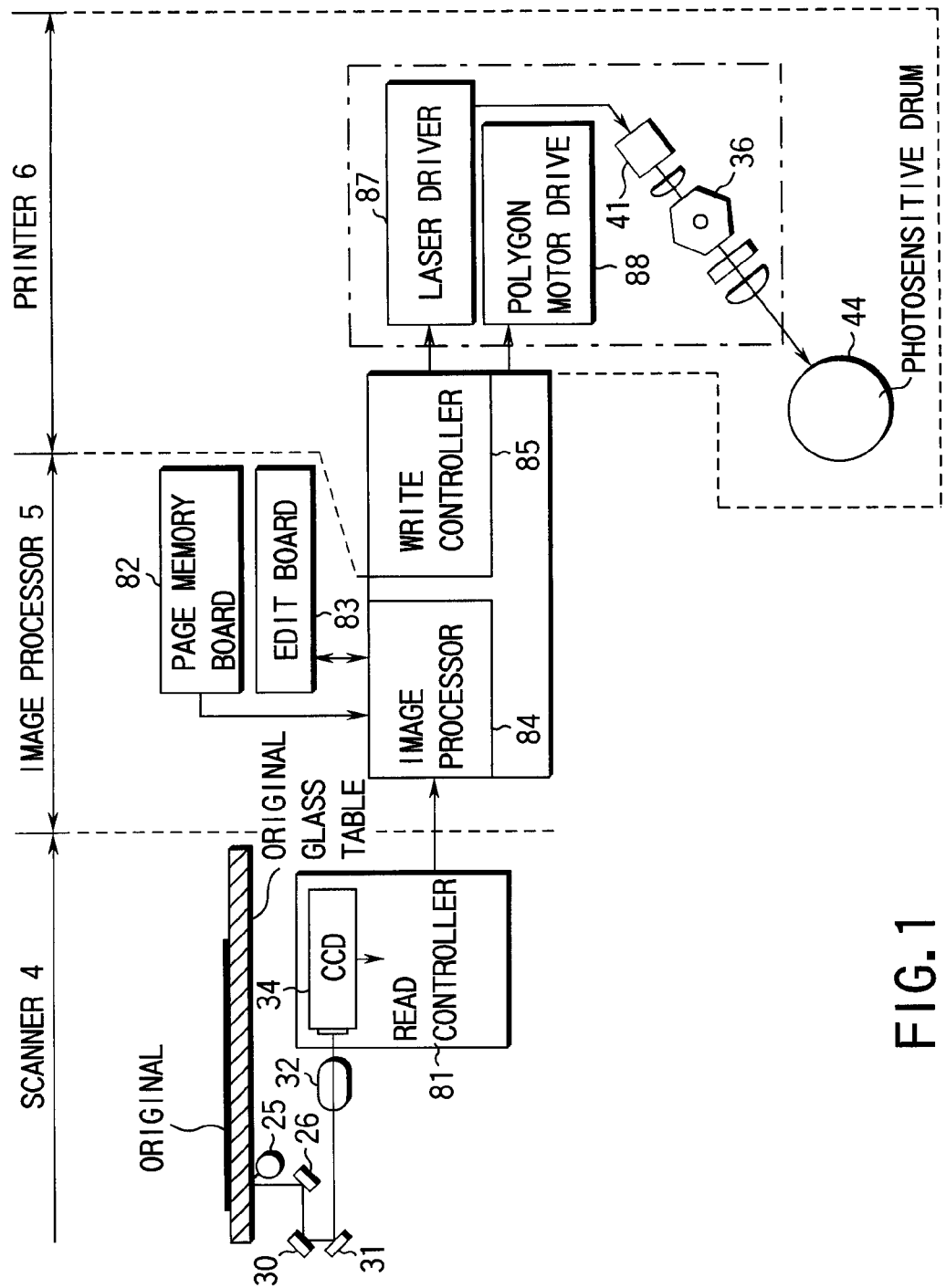
FIG. 1 is a block diagram showing the schematic arrangement of a digital copying machine to which an image processing system according to the present invention is applied.

Reference will now be made in detail to the presently preferred embodiments of the invention as illustrated in the accompanying drawings, in which like reference characters designate like or corresponding parts throughout the several drawings.

An embodiment of the present invention will be described with reference to the several views of the accompanying drawing.

FIG. 1 is a block diagram showing the schematic arrangement of the main part of a digital copying machine to which an image processing system according to the present invention is applied.

The main part of the digital copying machine is made up of a scanner 4, image processor 5, and printer 6.

As shown in FIG. 1, the scanner 4 of the digital copying machine reads an original image by directly illuminating the original surface with light from an exposure lamp 25, and guiding the optical image by the reflected light to a 4-channel output CCD 34 through mirrors 26, 30, and 31 and imaging lens 32.

The 4-channel output CCD 34 photoelectrically converts the optical image into charge signals in a plurality of (e.g., 7500 for 600 dpi) light-receiving elements.

The charge signals are sequentially transferred as analog signals by the internal CCD analog shift register (to be described later) of the 4-channel output CCD 34.

As shown in FIG. 1, the image processor 5 as the control system of the digital copying machine comprises a read controller 81 including the 4-channel output CCD 34, page memory board 82, edit board 83, image processor 84, and write controller 85.

As shown in FIG. 1, the printer 6 of the digital copying machine comprises a laser driver 87 and polygon motor drive 88 that are controlled by an output from the image processor 5. A laser beam from a semi-conductor laser 41 is deflected by a polygon mirror 36 and guided to a photosensitive drum 44.

Figure 2:
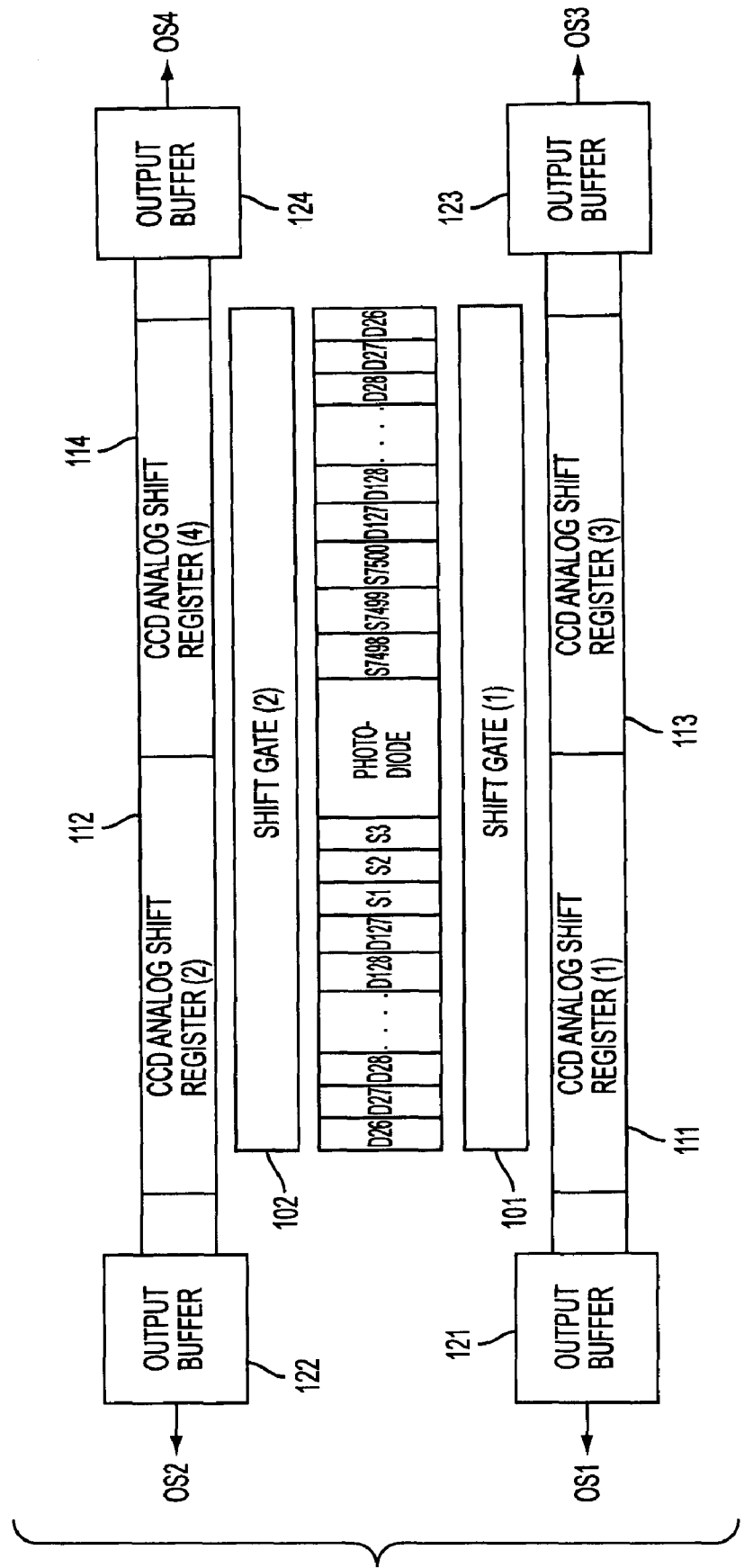
FIG. 2 is a block diagram showing the arrangement of a 4-channel output CCD in a scanner in FIG. 1.

FIG. 2 shows the arrangement of the 4-channel output CCD 34 in detail.

The 4-channel output CCD 34 is constituted by light-receiving elements (photodiodes or the like) S1 to S7500 sequentially aligned, shift gates 101 and 102, CCD analog shift registers 111 to 114, and output buffers 121 to 124.

As shown in FIG. 2, since the 4-channel output CCD 34 has four outputs by dividing the even and odd components of a signal output into left and right components, the 4-channel output CCD 34 uses the four CCD analog shift registers 111, 112, 113, and 114.

The CCD analog shift register 111 sequentially transfers signals from one from a light-receiving element at the left end of the odd component. The analog shift register 112 sequentially transfers signals from one from a light-receiving element at the left end of the even component. The analog shift register 113 sequentially transfers signals from one from a light-receiving element at the right end of the odd component. The analog shift register 114 sequentially transfers signals from one from a light-receiving element at the right end of the even component.

The last signals output from the left and right ends of the odd and even components are from the light-receiving elements S3749, S3750, S3751, and S3752 adjacent at the center of the light-receiving elements S1 to S7500.

Control signals (transfer clock, shift gate signal, reset signal, and clamp signal) necessary for driving the 4-channel output CCD 34 are generated by the CCD driving function of a high-speed scanner control application specific integrated circuit (ASIC; to be described later).

Figure 3:
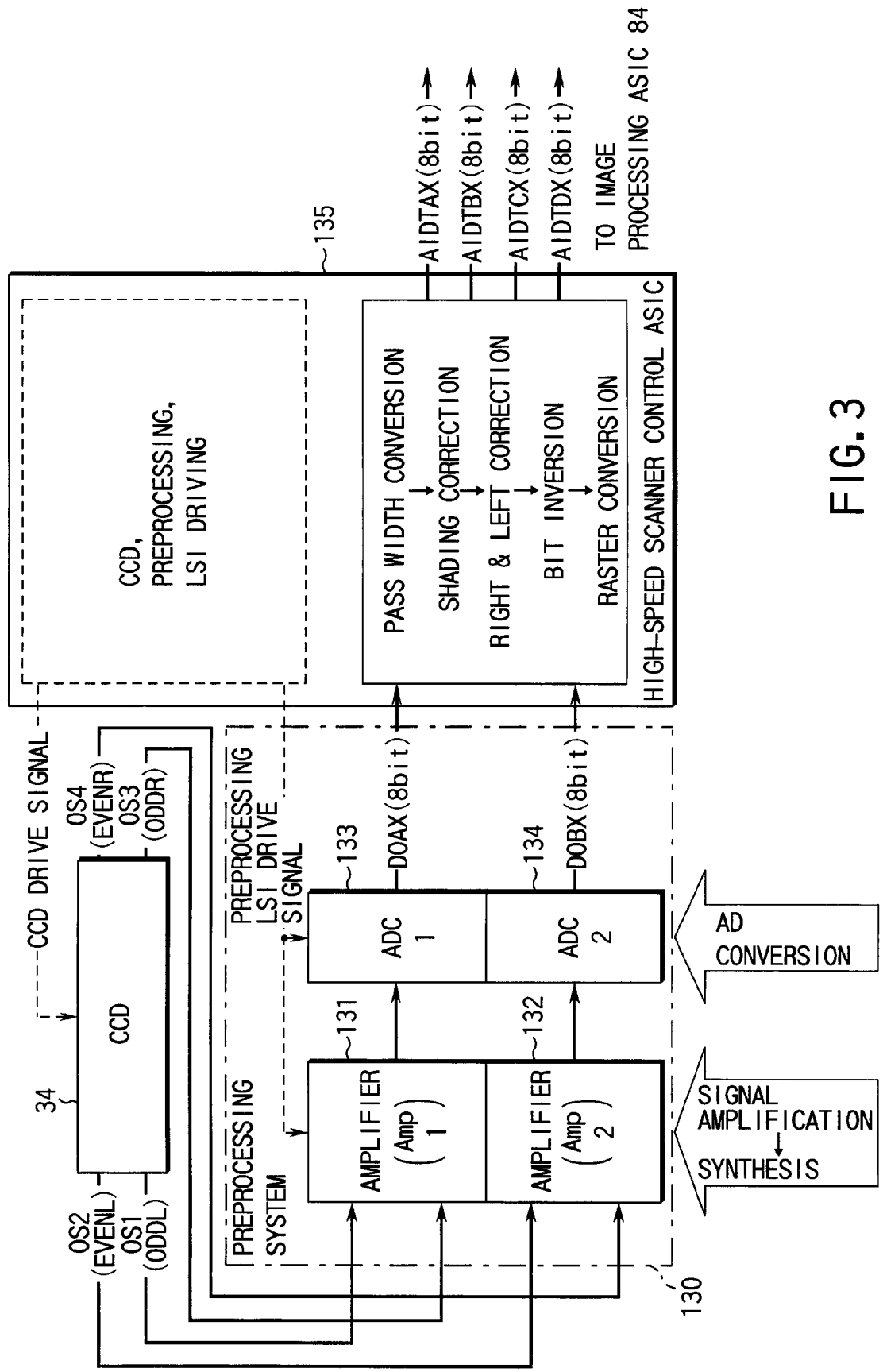
FIG. 3 is a block diagram showing the arrangement of a preprocessing system and high-speed scanner control ASIC in an image processor in FIG. 1.

FIG. 3 shows the arrangement of a preprocessing system 130 and high-speed scanner control ASIC 135 for transferring image data in the 4-channel output CCD 34 that is mounted on the read controller 81.

The preprocessing system 130 is made up of amplifiers 131 and 132, and A/D converters 133 and 134.

In the preprocessing system 130, analog signals output from the 4-channel output CCD 34 are sampled for each pixel signal and amplified by the amplifiers (Amp: analog signal processing integrated circuits) 131 and 132.

The amplifiers 131 and 132 used here can parallel-process two channels by one chip.

The amplifier 131 receives two, left and right channels (output terminals OS1 and OS3) of the odd component of a pixel signal from the 4-channel output CCD 34.

The amplifier 132 receives two, left and right channel (output terminals OS2 and OS4) of the even component of the pixel signal from the 4-channel output CCD 34.

Each of the amplifiers 131 and 132 parallel-processes (samples and amplifies) the two channel pixel signals from the left and right of the 4-channel output CCD 34, and synthesizes (multiplexes) them into one channel.

More specifically, the amplifier 131 synthesizes the left and right signals of the odd component into one channel, and the amplifier 132 synthesizes the left and right signals of the even component into one channel. The amplifiers 131 and 132 output the respective channels.

The amplifier 131 processes the left and right pixel signals of the odd component from the 4-channel output CCD 34 at once, whereas the amplifier 132 processes the left and right pixel signals of the even component from the 4-channel output CCD 34 at once.

This arrangement prevents distortion of the left and right signals of each of the even and odd components of an output signal from the 4-channel output CCD 34 from depending on variations between the chips of the amplifiers (131 and 132), i.e., variations in circuit characteristics owing to a chip difference.

In this case, the signal output rates of the amplifiers 131 and 132 are twice the signal input rates of the amplifiers 131 and 132.

Analog signals for respective pixels amplified to proper processing levels of signals that are output from the amplifiers 131 and 132 are A/D-converted into digital signals by A/D converters (ADCs 133 and 134).

That is, the amplifier 131 parallel-samples and amplifies the pixel signals of the two, left and right channels of an odd component output from the 4-channel output CCD 34, and synthesizes them into one channel.

The analog signal output from the amplifier 131 is A/D-converted by the A/D converter 133.

The amplifier 132 parallel-samples and amplifies the pixel signals of the two, left and right channels of an even component output from the 4-channel output CCD 34, and synthesizes them into one channel.

The analog signal output from the amplifier 132 is A/D-converted by the A/D converter 134.

Since the A/D converters 133 and 134 used here have a resolution of 8 bits (bit: 256 steps), pixel data is 8-bit data per pixel.

Pixel signals (analog signals) output from 4-channel output CCD 34 are amplified and synthesized by the amplifiers 131 and 132 on the basis of image information loaded into the 4-channel output CCD 34 (optical image data input to the 4-channel output CCD 34). The synthesized signals are A/D-converted into digital signals by the A/D converters 133 and 134. The series of processes are called preprocessing in the scanner 4.

Respective units which execute this preprocessing constitute the preprocessing system 130.

Control signals (sample & hold pulse, synthesis signal, and clamp signal) necessary for driving the amplifiers 131 and 132, and A/D conversion clocks necessary for A/D conversion in the A/D converters 133 and 134 are generated by the preprocessing LSI driving function of the high-speed scanner control ASIC 135.

The preprocessed pixel signals (8-bit data per pixel; to be referred to as image data) based on image information are input to the high-speed scanner control ASIC 135 where the signals undergo shading correction, right & left correction, and raster conversion.

Figure 4:
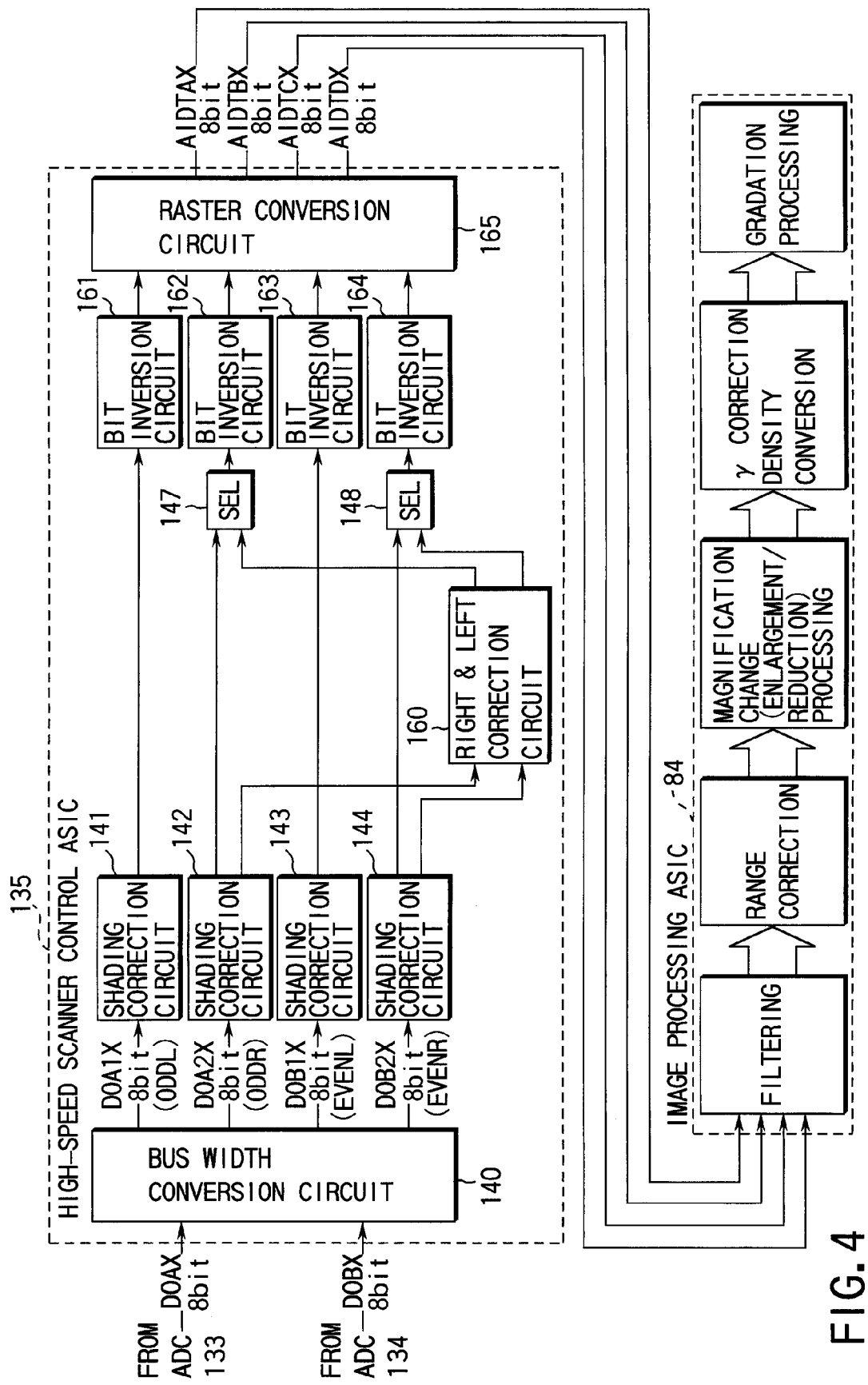
FIG. 4 is a block diagram showing the detailed arrangement of the high-speed scanner control ASIC in FIG. 3.

FIG. 4 shows the arrangement of the high-speed scanner control ASIC 135.

More specifically, the high-speed scanner control ASIC 135 comprises a bus width conversion circuit 140, shading correction circuits 141, 142, 143, and 144, bus selection circuits (SEL) 147 and 148, right & left correction circuit 160, bit inversion circuits 161, 162, 163, and 164, and raster conversion circuit 165.

As described above, image data preprocessed by the preprocessing system 130 are input to the high-speed scanner control ASIC 135 through two channels as DOAX (8 bits: data obtained by synthesizing the left and right signals of an odd component) and DOBX (8 bits: data obtained by synthesizing the left and right signals of an even component).

All the processes in the high-speed scanner control ASIC 135 are done for digital image data from the preprocessing system 130.

These image data are decomposed into left and right data of odd and even components through the bus width conversion circuit 140.

More specifically, DOAX (8 bits) as data obtained by synthesizing the left and right signals of an odd component is decomposed into DOA1X (8 bits: left data of the odd component) and DOA2X (8 bits: right data of the odd component).

DOBX (8 bits) as data obtained by synthesizing the left and right signals of an even component is decomposed into DOB1X (8 bits: left data of the even component) and DOB2X (8 bits: right data of the even component).

The image data input through two channels are decomposed into four channels by the bus width conversion circuit 140. When image data DOAX and DOBX are input through two channels at a data rate of 40 MHz per channel, the image data after bus width conversion are output as DOA1X, DOA2X, DOB1X, and DOB2X to the next stage through four channels at 20 MHz per channel.

The image data DOA1X (8 bits: left data of the odd component), DOA2X (8 bits: right data of the odd component), DOB1X (8 bits: left data of the even component), and DOB2X (8 bits: right data of the even component) decomposed by bus width conversion undergo shading correction by the shading correction circuits 141, 142, 143, and 144.

As shown in FIG. 4, since the high-speed scanner control ASIC 135 is equipped with the four shading correction circuits, the 4-channel image data DOA1X, DOA2X, DOB1X, and DOB2X after bus width conversion can be simultaneously parallel-processed.

Note that the influence of density gradient deviation of image density generated on each pixel of image data is corrected by the shading correction function. The influence of linear deviation of image density generated between left and right image data (between signal transfer paths (processing paths)) is corrected by the right & left correction circuit 160.

The high-speed scanner control ASIC 135 outputs the internally processed image data as AIDTAX (8 bits), AIDTBX (8 bits), AIDTCX (8 bits), and AIDTDX (8 bits) to the image processing ASIC 84.

The image data input to the image processing ASIC 84 undergo a series of data processes by image processing such as filtering, range correction, magnification change (enlargement/reduction) processing, γ correction density conversion, and gradation processing in the image processing ASIC 84.

The main part of the present invention will be explained. This main part provides an image processing system including an image forming apparatus and its control method capable of easily realizing reduction in the subscanning direction by changing the magnification in the image read subscanning direction (carriage moving direction) by both the conventional carriage moving speed change method and the signal processing method without increasing the device width (read scanner size), avoiding variations arising from high-speed carriage operation, performing any complicated arithmetic processing, or requiring any large-capacity memory in the image forming apparatus using a charge-coupled device (CCD), e.g., the 4-channel output CCD for a high-speed digital PPC as an image read photoelectric conversion element in the above high-speed scanner.

Figure 5:
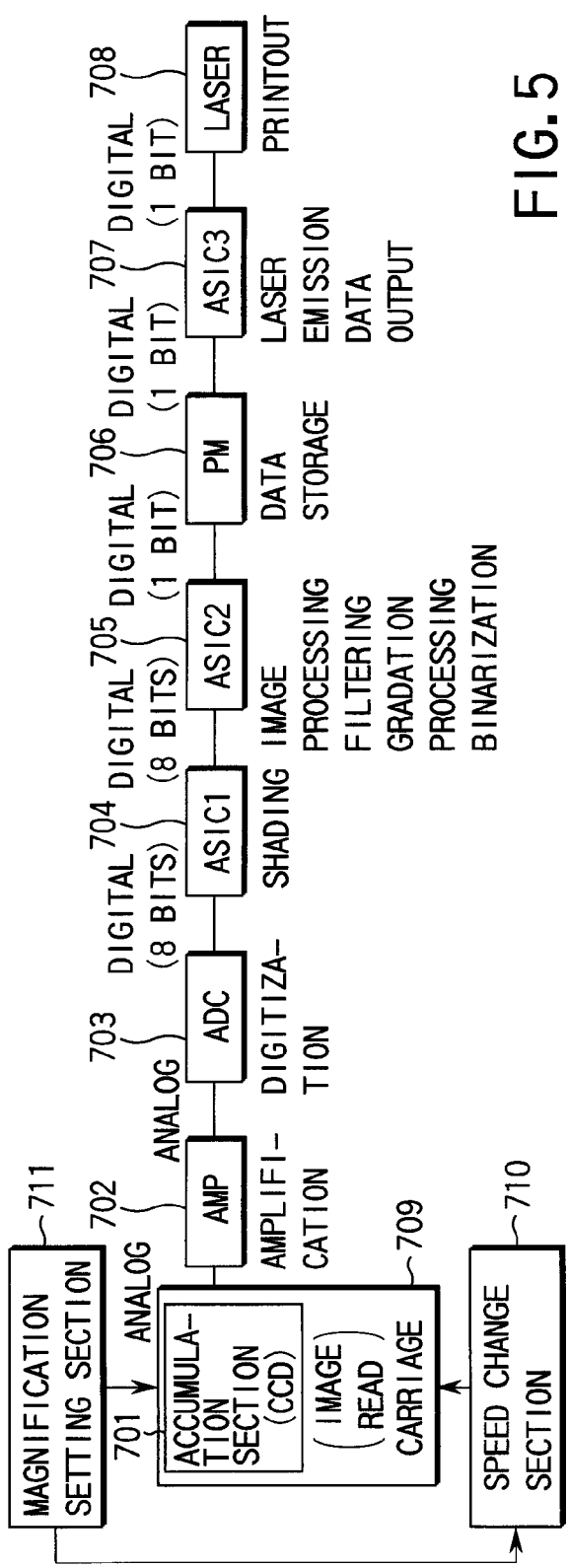
FIG. 5 is a block diagram showing the arrangement of the main part of the image processing system according to the present invention along the flow of an image signal.

FIG. 5 is a block diagram showing the arrangement of the main part of the image forming apparatus according to the present invention along the flow of an image signal.

As shown in FIG. 5, an analog image signal read by an accumulation section (CCD) 701 of the scanner 4 is amplified by an AMP (amplifier) 702 of the preprocessing system 130, converted into digital image data by an ADC (A/D converter) 703, and input to a scanner image ASIC (1) 704.

The digital image data from the ADC (A/D converter) 703 undergoes shading correction by the scanner ASIC (1) 704 in order to correct the sensitivity of the CCD 701 for each pixel. The corrected data is sent to a subsequent image processing ASIC (2) 705 where the data undergoes image processing such as filtering.

The digital image data having undergone image processing such as filtering in the image processing ASIC (2) 705 is output as binary data from the image processing ASIC (2) 705, stored in a memory called a page memory (PM) 706, and sent to a print data output ASIC (3) 707.

Based on the print data output from the print data output ASIC (3) 707, a laser 708 emits a laser beam to form a latent image on the above-described photo-sensitive drum. The latent image is developed with toner, and the toner image is transferred to a paper sheet, fixed, and output as a copy.

In general, since the input light quantity (1x/sec) to the CCD 701 is constant, a light accumulation time from reception of light of one main scanning line by the CCD 701 to shift of a signal to a transmission buffer in the CCD 701 is kept constant.

To change the subscanning magnification when a copy magnification is set by a magnification setting section 711, the carriage moving speed is changed by a speed change section 710 to change the subscanning length read by one main scanning line.

Letting V (mm/sec) be the carriage,-moving speed for 100% copy and k% be the copy magnification, a carriage moving-speed V' (mm/sec) is given by $$V'=V \times (100/k)$$

Figure 6:
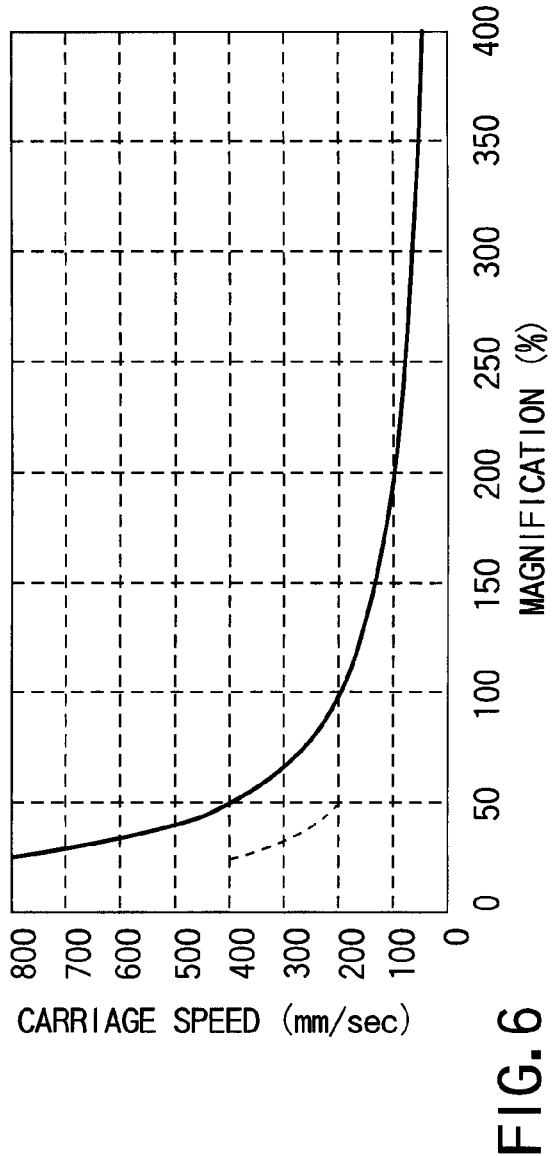
FIG. 6 is a graph showing the relationship between the carriage moving speed (mm/sec) and copy magnification (%) in the main part of the image processing system according to the present invention.

This is represented by the solid line in FIG. 6 showing the relationship between the carriage moving speed (mm/sec) and copy magnification (%).

The present invention employs both the conventional carriage speed change method and the image processing (arithmetic processing) method to realize reduction at a magnification equal to or smaller than a certain reduction magnification at which the carriage moving speed must be very high.

First Embodiment (1) The present invention makes the carriage moving speed correspond to twice the set magnification (the moving speed is ½ the moving speed in the conventional method indicated by the broken line in FIG. 6) when the magnification is equal to or smaller than a certain magnification in reduction (the carriage moving speed is high) in changing the subscanning magnification only by the conventional carriage moving speed change method.

(2) However, the subscanning length (the number of read lines in the main scanning direction) becomes twice the desirable length at this magnification.

To avoid this, the present invention further uses a line memory for one main scanning line in the scanner ASIC (1) 704. As shown in FIGS. 7A to 7G, data S1, S2, . . . , S100 of the first main scanning line are stored in the line memory. After data of the next main scanning line are received, averages (S1+S2)/2, (S3+S4)/2, . . . , (S99+S100)/2 with the data of the first main scanning line are calculated. These averages are output to the subsequent image processing ASIC (2) 705.

Thus, the image processing ASIC (2) 705 receives the main scanning data every other line by image data transfer at a normal timing.

As a result, the subscanning image data amount shown in FIGS. 7A to 7G is halved, compared to the absence of average calculation (S1, S2, , S100) shown in FIGS. 8A to 8D. Data corresponding to a predetermined magnification can be obtained.

The image processing ASIC (2) 705 can perform the same filtering, gradation processing, binarization, and main scanning magnification change processing as in the normal state.

However, if image data processed by the image processing ASIC (2) 705 is directly transferred to the print data output ASIC (3) 707 (laser emission), the laser 708 undesirably prints the data every other line.

To avoid this, the present invention temporarily stores image data processed by the image processing ASIC (2) 705 in the page memory (PM) 706.

At this time, the image data processed by the image processing ASIC (2) 705 is binary.

For this reason, the data can be stored with a much smaller memory capacity, compared to directly storing multilevel data obtained by amplifying an analog image signal read by the CCD 701 of the scanner 4 by the AMP (amplifier) 702 of the preprocessing system 130, and converting the analog image data into digital image data by the ADC (A/D converter) 703.

In the first embodiment, reduction processing using the carriage moving speed and the average of data of two main scanning lines is executed when the copy magnification is 50% or less, as shown in the graph (see FIG. 6).

However, the control switching magnification is not limited to 50%, but may be 60% or 65%.

Further, the present invention is not limited to the method of making the carriage moving speed correspond to twice the set magnification so as to become ½ the moving speed in the conventional method when the subscanning magnification is to be changed. Alternatively, the moving speed may be changed to 1/n (n is a natural number larger than 1) or 1/n (n=$2^m$; m is a natural number).

Especially, the latter can advantageously realize bit shift processing for digital data with available circuit elements in units of the second power, or the like.

Second Embodiment

In the first embodiment, (2) 1-line data is stored in the line memory for one main scanning line, and averaged with data of the next line to halve image data and the subscanning magnification.

However, as long as image degradation falls within an allowable range without using any line memory, main scanning data is thinned out every other line (S1, S3, . . . , S99) to halve the data amount, thereby changing the magnification with the same effects.

In this way, the present invention can realize reduction in the subscanning direction without increasing the device width (read scanner size), avoiding variations arising from high-speed carriage operation, performing any complicated arithmetic processing, or requiring any large-capacity memory.

As has been described in detail above, the present invention can provide an image processing system including an image processing method and image processing apparatus capable of easily realizing reduction (magnification change) processing in the subscanning direction by changing the magnification in the image read subscanning direction (carriage moving direction) by both the conventional carriage moving speed change method and the signal processing method without increasing the device width (read scanner size), avoiding variations arising from high-speed carriage operation, performing any complicated arithmetic processing, or requiring any large-capacity memory in an image forming apparatus using, e.g., a charge-coupled device (CCD) as an image read photoelectric conversion element in a scanner.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. An image processing method comprising:

a first step of changing a reading width on an original read by one main scanning line, by changing a carriage moving speed, which is defined according to a relationship with magnifications between a maximum reduction magnification and a maximum enlargement magnification, between a maximum moving speed and a minimum moving speed, to perform magnification change in a subscanning direction; and a second step of subjecting image data read by changing the reading width on the original to be read by the one main scanning line to image calculation, and thereby correcting the magnification change in the subscanning direction to a predetermined magnification, the first step comprising:

setting a magnification for an original image to be processed; and when the set magnification is at least a predetermined magnification in reduction changing in accordance with the set magnification a moving speed of a carriage for reading the original image to be processed, reducing the moving speed to ½ or less a carriage moving speed defined according to the relationship with the magnifications between the maximum reduction magnification and the maximum enlargement magnification, thereby maintaining the carriage moving speed within a range which does not reach the maximum moving speed even at the maximum reduction magnification, the second step comprising:

accumulating, in a 1-line element corresponding to a main scanning direction, an electrical signal prepared by photoelectrically converting optical image information obtained by scanning the original image to be processed by the carriage in the subscanning direction;

converting the electrical signal into a digital signal, storing 1-line input image data in the main scanning direction in reduction, performing average calculation for multilevel n-line data in the main scanning direction to change a subscanning magnification in reduction, and outputting 1-line output image data in the main scanning direction; and performing predetermined image data processing including processing of receiving the 1-line output image data in the main scanning direction for each pixel, and converting the image data into binary data.

2. A method according to claim 1, the second step further comprising storing at least 1-page binary data of the original image to be processed among the binary data.

3. A method according to claim 1, wherein, if the set magnification is equal to or less than any one of 65%, 60%, and 50%, the carriage moving speed reduced to ½ or less includes any one of ½, ¼, ⅛, and ¹⁄₁₆ the carriage moving speed defined according to the relationship with the magnifications between the maximum reduction magnification and the maximum enlargement magnification.

4. An image processing method:

a first step of changing a reading width on an original read by one main scanning line, by changing a carriage moving speed, which is defined according to a relationship with magnifications between a maximum reduction magnification and a maximum enlargement magnification, between a maximum moving speed and a minimum moving speed, to perform magnification change in a subscanning direction; and a second step of subjecting image data read by changing the reading width on the original to be read by the one main scanning line to image calculation and thereby correcting the magnification change in the subscanning direction to a predetermined magnification, the first step, comprising:

setting a magnification for an original image to be processed; and when the set magnification is at least a predetermined magnification in reduction changing in accordance with the set magnification a moving speed of a carriage for reading the original image to be processed, reducing the moving speed to ½ or less a carriage moving speed defined according to the relationship with the magnifications between the maximum reduction magnification and the maximum enlargement magnification, thereby maintaining the carriage moving speed within a range which does not reach the maximum moving speed even at the maximum reduction magnification, the second step comprising:

accumulating, in a 1-line element corresponding to a main scanning direction, an electrical signal prepared by photoelectrically converting optical image information obtained by scanning the original image to be processed by the carriage in the subscanning direction;

converting the electrical signal into a digital signal, thinning out multilevel 1-line input image data in the main scanning direction to change a subscanning magnification in reduction, and outputting 1-line output image data in the main scanning direction; and performing predetermined image data processing including processing of receiving the 1-line output image data in the main scanning direction for each pixel, and converting the image data into binary data.

5. A method according to claim 4, the second step further comprising storing at least 1-page binary data of the original image to be processed among the binary data.

6. A method according to claim 4, wherein, if the set magnification is equal to or less than any one of 65%, 60%, and 50%, the carriage moving speed reduced to ½ or less includes any one of ½, ¼, ⅛, and ¹⁄₁₆ the carriage moving speed defined according to the relationship with the magnifications between the maximum reduction magnification and the maximum enlargement magnification.

7. An image processing apparatus comprising:

first means for changing a reading width on an original read by one main scanning line, by changing a carriage moving speed, which is defined according to a relationship with magnifications between a maximum reduction magnification and a maximum enlargement magnification, between a maximum moving speed and a minimum moving speed, to perform magnification change in a subscanning direction; and second means for subjecting image data read by changing the reading width on the original to be read by the one main scanning line to image calculation, and thereby correcting the magnification change in the subscanning direction to a predetermined magnification, the first means comprising:

magnification setting means for setting a copy magnification of an original image to be formed; and speed change means for changing a moving speed of the carriage in accordance with the copy magnification set by said magnification setting means, and when the set copy magnification is at least a predetermined magnification in reduction, reducing the moving speed to ½ or less a carriage moving speed defined according to the relationship with the magnifications between the maximum reduction magnification and the maximum enlargement magnification, thereby maintaining the carriage moving speed within a range which does not reach the maximum moving speed even at the maximum reduction magnification, the second means comprising:
accumulation means for accumulating, in a 1-line element corresponding to a main scanning direction, an electrical signal prepared by photoelectrically converting optical image information obtained by scanning the original image to be formed with the carriage in the subscanning direction;
preprocessing means which converts the electrical signal accumulated in said accumulation means into a digital signal, has a line memory for storing 1-line input image data in the main scanning direction, performs arithmetic processing for multilevel n-line data in the main scanning direction to change a subscanning magnification in reduction, and outputs 1-line output image data in the main scanning direction;
image data processing means for performing predetermined image data processing including processing of receiving for each pixel the 1-line output image data in the main scanning direction output from said preprocessing means, and converting the image data into binary data; and
storage means for storing at least 1-page binary data of the original image to be formed among the binary data from said image data processing means,
wherein in reduction, the carriage moving speed is reduced to ½ or less a carriage moving speed in changing the subscanning magnification by said speed change means only by the carriage moving speed, and at the same time, multilevel n-line data in the main scanning direction is converted into 1-line data by average calculation by said preprocessing means, thereby changing the subscanning magnification.

8. An apparatus according to claim 7, wherein, if the set magnification is equal to or less than any one of 65%, 60%, and 50%, the carriage moving speed reduced to ½ or less includes any one of ½, ¼, ⅛, and ¹⁄₁₆ the carriage moving speed defined according to the relationship with the magnifications between the maximum reduction magnification and the maximum enlargement magnification.

9. An image processing apparatus comprising:
first means for changing a reading width on an original read by one main scanning line, by changing a carriage moving speed, which is defined according to a relationship with magnifications between a maximum reduction magnification and a maximum enlargement magnifications, between a maximum moving speed and a minimum moving speed, to perform magnification change in a subscanning direction; and
second means for subjecting image data read by changing the reading width on the original to be read by the one main scanning line to image calculation, and thereby correcting the magnification change in the subscanning direction to a predetermined magnification, the first means comprising:
magnification setting means for setting a copy magnification of an original image to be formed; and
speed change means for changing a moving speed of the carriage in accordance with the copy magnification set by said magnification setting means, and when the set copy magnification is at least a predetermined magnification in reduction, reducing the moving speed to ½ or less a carriage moving speed defined according to the relationship with magnifications between the maximum reduction magnification and the maximum enlargement magnification, thereby maintaining the carriage moving speed within a range which does not reach the maximum moving speed even at the maximum reduction magnification, the second means comprising:
accumulation means for accumulating, in a 1-line element corresponding to a main scanning direction, an electrical signal prepared by the photoelectrically converting optical image information obtained by scanning the original image to be formed with the carriage in the subscanning direction;
preprocessing means for converting the electrical signal accumulated in said accumulation means into a digital signal, performing arithmetic processing for multilevel n-line input image data in the main scanning direction to change a subscanning magnification in reduction, and outputting 1-line output image data in the main scanning direction;
image data processing means for performing predetermined image data processing including processing of receiving for each pixel the 1-line output image data in the main scanning direction output from said preprocessing means, and converting the image data into binary data; and
storage means for storing at least 1-page binary data of the original image to be formed among the binary data from said image data processing means,
wherein in reduction, the carriage moving speed is reduced to ½ or less a carriage moving speed in changing the subscanning magnification by said speed change means only by the carriage moving speed, and at the same time, multilevel n-line data in the main scanning direction is converted into 1-line data by thinning processing by said preprocessing means, thereby changing the subscanning magnification.

10. An apparatus according to claim 9, wherein, if the set magnification is equal to or less than any one of 65%, 60%, and 50%, the carriage moving speed reduced to ½ or less includes any one of ½, ¼, ⅛, and ¹⁄₁₆ the carriage moving speed defined according to the relationship with the magnifications between the maximum reduction magnification and the maximum enlargement magnification.

* * * * *